United States Patent Office 3,190,800
Patented June 22, 1965

3,190,800
METHOD OF PRODUCING DEPRESSANT EFFECT
Arthur Furst, Palo Alto, Calif., assignor to Atlas Chemical Industries, Inc., Wilmington, Del., a corporation of Delaware
No Drawing. Filed Sept. 29, 1961, Ser. No. 141,608
1 Claim. (Cl. 167—65)

This invention relates to psychopharmacologic compositions of matter, i.e., those which influence mood and behaviour, and more especially relate to the use of certain esters of hydroxamic acids for this purpose.

Compositions of matter in this field, such as iproniazide (N' isopropyl isonicotinyl hydrazine) act to depress or stimulate certain areas of the brain. Iproniazide, in particular, has been found to have a marked anti-depressive effect. However, the accompanying side effects such as overstimulation, nightmares, liver damage and heavy depression following withdrawal of the drug have severely limited its use.

While other compounds have appeared which show promise in this field, psychopharmacological compositions having negligible side effects are continuously being sought.

Bearing in mind the foregoing, it is a major object of the present invention to produce compositions of matter affecting mood and behaviour while reducing deleterious side effects.

It is another object of the present invention to provide compositions of matter affecting mood and behaviour, from the class of compounds known as hydroxamic acid esters.

A further object of the present invention is to provide an improved method of treatment utilizing certain compositions of matter from the class of compounds known as hydroxamic acid esters, to counteract an exhibited psychic activity.

These, and other objects of the present invention, will become more clearly understood with reference to the following description.

The compositions that appear of greatest interest to date have the following structural formula

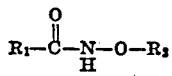

where $R_1$ is an aliphatic, a substituted aliphatic, or is heterocyclic, dicarboxylic, ketocarboxylic, aromatic arylalkyl, or substituted heterocyclic, dicarboxylic, ketocarboxylic, alkaryl or aromatic;
and
$R_2$ is an aliphatic or substituted aliphatic having up to a total of 4 carbon atoms, an alkylaryl compound, or substituted alkylaryl compound.

Specific examples of these compounds that have been synthesized are:

Isopropyl isonicotinyl-hydroxamate
Isopropyl nicotinohydroxamate
Isopropyl salicylohydroxamate
Isopropyl anisohydroxamate
Isopropyl cinnamohydroxamate
Isopropyl furohydroxamate
Isopropyl 3,4,5-trimethoxybenzohydroxamate
Isopropyl acetohydroxamate
Benzyl cinnamohydroxamate
Benzyl salicylohydroxamate
Benzyl furohydroxamate
Benzyl 3,4,5-trimethoxybenzohydroxamate
Benzyl 3,4,5-trimethoxycinnamohydroxamate
Benzyl lactohydroxamate
Benzyl 3,4,5-trimethoxyphenylacetohydroxamate
Isobutyl 3,4,5-trimethoxybenzahydroxamate
Isopropyl 3,4,5-trimethoxycinnamohydroxamate
Isobutyl furohydroxamate
Isobutyl isonicotinohydroxamate
Benzyl benzilohydroxamate
Isobutyl nicotinohydroxamate
Isobutyl anisohydroxamate
Isopropyl benzilohydroxamate
Isopropyl 3,4,5-trimethoxyphenylacetohydroxamate These compounds, of the type

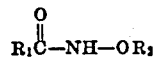

are preferably prepared by reacting the $R_1$ acid salt with a chloride and an $R_2$ oxyamine. The mechanism is believed to be as follows: The $R_1$ acid salt reacts with a chloride such as oxalyl chloride (ClOCCOCl) or thionyl chloride (SOCl$_2$) to form the $R_1$ acid chloride ($R_1$COCl). This, in turn, reacts with the $R_2$ oxyamine hydrochloride ($R_2$ONH$_2$HCl) in the presence of pyridine to form the desired hydroxamic acid ester

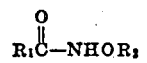

Pyridine is added so that all the hydrochloric acid formed is taken up by this compound.

Generally speaking, the main reactions are believed to be:

(1)
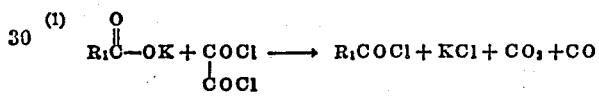

(2)
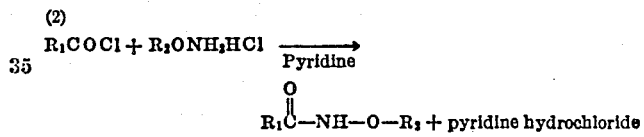

A specific example, the preparation of O-isopropyl isonicotinyl hydroxamate, follows:

The isonicotinic acid salt is first made from isonicotinic acid by reacting it with a potassium salt such as K$_2$CO$_3$. The acid is dissolved in alcohol, the K$_2$CO$_3$ dissolved in water. The solvents are then removed, and the mixture dried.

The isonicotinic acid salt remaining is placed in a reactor vessel, and an equivalent amount of oxalyl chloride, dissolved in benzene, is added dropwise, at a temperature of 5–10° C., while stirring. The reaction mix is raised to room temperature and stirred for about an hour.

The reaction mix is then raised to the reflux temperature of the oxalyl chloride for about an hour. The reaction mix is allowed to cool. Any excess oxalyl chloride is then distilled off. The remaining solution is siphoned off and contains essentially isonicotinyl chloride dissolved in benzene.

The free alkoxyamine is made by adding an amount of isopropoxyamine hydrochloride (anhydrous) to an excess of pyridine such that the free alkoxyamine is formed. An equivalent amount is used, taken with respect to the isonicotinyl chloride.

This just-described reaction is performed at room temperature while stirring the mixture for about fifteen minutes.

The mixture is then cooled to 4–5° C. The isonicotinyl chloride (dissolved in benzene) is then added, drop by drop, to the free isopropoxyamine while stirring. The temperature should not rise above 10° C.

The resulting mixture is then brought to room temperature and stirred for several hours, this mixture comprising pyridine hydrochloride and the desired product isopropyl isonicotinyl hydroxamate.

Ether is then added to the reaction mix to thereby precipitate the pyridine hydrochloride. The ether solution remaining is filtered off and concentrated by removal of ether and benzene.

Water is added to lower the boiling point of pyridine, and the pyridine is removed from the product, isopropyl isonicotinyl hydroxamate, by flash evaporation. The product remains.

The main reactions are set forth below:

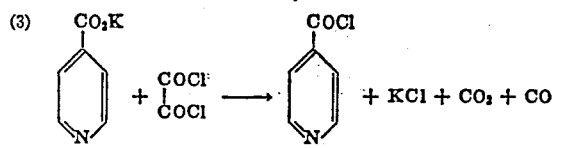

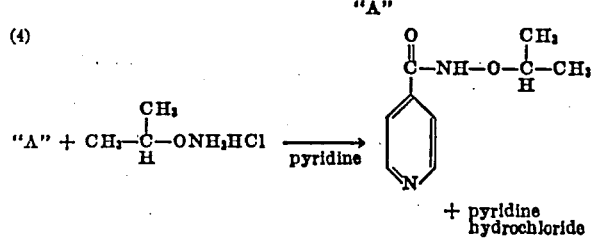

A number of the above hydroxamic acid esters can also be prepared according to the following general method of synthesis:

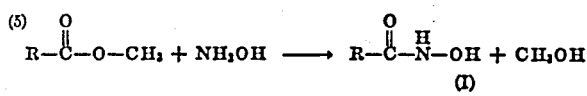

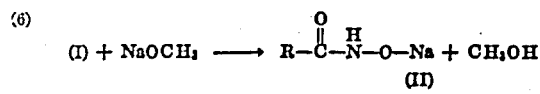

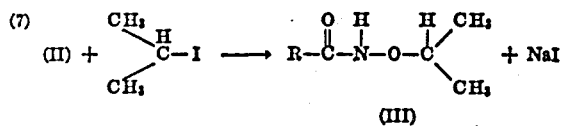

However, the first described method is preferred for several reasons. First, in those cases in which $R_1$ is

the following quaternary compounds are formed:

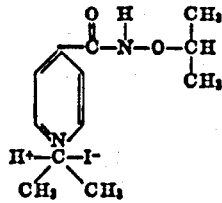

and/or

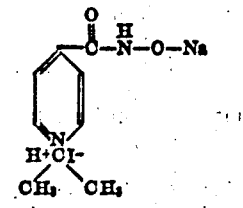

rather than the desired Compound III above.

Secondly, in forming compounds where $R_2$ is isobutyl, t-butyl, or isopropyl, dehydrohalogenation occurs if one attempts to follow Reactions (5), (6) and (7). Thus, the isopropyl iodide in Reaction (7) is at least partially destroyed by the formation of HI and propylene.

Thirdly, the synthesis according to the preferred method presents another advantage in that the hydroxamic acids (which are not commercially available) need not first be prepared as intermediates.

As one example, the effect on mood and behaviour of O isopropyl isonicotinyl hydroxamate (IIH) is set out below.

Five mice were injected with 100 mg./kg. of IIH. The animals appeared depressed after 75 minutes; they were all huddled in a corner after 105 minutes; and in 180 minutes were all asleep. Normal animals did not react in this manner, but rather engaged in normal activity throughout the stated periods of time.

All the animals recovered. It therefore would appear that IIH is a depressant.

It appears that IIH will protect against lethal metrazole convulsions to a greater extent than will iproniazide (INH). Thus, the following data indicates the results of comparative tests. Four mice were injected with INH and observed for 1½ hours. They were then injected with metrazole. This procedure was repeated with IIH, the ratio of drug to body weight being the same in all cases. Table I below tabulates the results.

*Table I*

|  | INH | IIH | Control |
|---|---|---|---|
| Observation in first 1½ hours after injection. | No noticeable change in activity. | Animals depressed. | No change in activity. |
| After metrazole injection. | Strong convulsions. | Mild convulsions. | Strong convulsions. |
| 24 hours after metrazole injection. | 3 dead 1 alive. | All 4 alive. | 1 dead 3 alive. |

It is therefore concluded that IIH protects against lethal metrazole convulsions.

A further test was performed showing IIH to be a depressant. Rats were anaesthetized with pentobarbital and electroencephalograms were taken. After normal brain waves were taken, IIH was injected in one group, and INH in another.

The tracings of the INH injected rats were those of an animal about to convulse. The tracings of the IIH injected rats were those of a very quite sleeping rat.

It is therefore concluded that IIH is a depressant and has a strong depressing effect on random activity.

However, it appears that the IIH will shorten sleep time of mice induced by barbiturates. Thus, mice were injected with Evipal ® (Hexobarbital), and the sleep time was noted. Evipal was injected at the 100 mg./kg. level; the average sleep time was 75 minutes. However, if IIH (100 mg./kg.) is injected ½ hour before Evipal, the sleep time is cut by 50%.

The hydroxamate ester compounds generically and specifically described above also appear to have psychopharmacological effect.

Modifications of these compounds disclosed herein can be made, by those skilled in the art, that lie within the scope of the invention. Hence, I intend to be found only by the claim which follows.

I claim:

A method of producing depressant activity in an animal which comprises the administration to said animal of a non-toxic but effective amount of O isopropyl isonicotinyl hydroxamate.

References Cited by the Examiner

Ciusa, Chem. Abst., vol. 44, p. 1018(a), 1950.

JULIAN S. LEVITT, *Primary Examiner*.

M. O. WOLK, *Examiner*.